United States Patent
Hama et al.

(10) Patent No.: US 11,498,322 B2
(45) Date of Patent: Nov. 15, 2022

(54) LAMINATED STRETCHED POLYAMIDE FILM

(71) Applicant: TOYOBO CO., LTD., Osaka (JP)

(72) Inventors: Kosuke Hama, Inuyama (JP); Takuro Endo, Inuyama (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 16/649,673

(22) PCT Filed: Sep. 7, 2018

(86) PCT No.: PCT/JP2018/033221
§ 371 (c)(1),
(2) Date: Mar. 23, 2020

(87) PCT Pub. No.: WO2019/065161
PCT Pub. Date: Apr. 4, 2019

(65) Prior Publication Data
US 2020/0254741 A1    Aug. 13, 2020

(30) Foreign Application Priority Data

Sep. 28, 2017 (JP) .............................. JP2017-187973
Feb. 1, 2018 (JP) .............................. JP2018-016402

(51) Int. Cl.
*B32B 27/34* (2006.01)
*B32B 27/08* (2006.01)
*B32B 7/12* (2006.01)

(52) U.S. Cl.
CPC ............... *B32B 27/34* (2013.01); *B32B 7/12* (2013.01); *B32B 27/08* (2013.01); *B32B 2250/02* (2013.01); *B32B 2250/03* (2013.01); *B32B 2250/24* (2013.01); *B32B 2270/00* (2013.01); *B32B 2307/518* (2013.01); *B32B 2307/7244* (2013.01); *B32B 2307/7246* (2013.01); *B32B 2309/105* (2013.01); *B32B 2439/70* (2013.01)

(58) Field of Classification Search
CPC ........... B32B 27/34; B32B 7/12; B32B 27/08; B32B 2307/518; B32B 2307/7244; B32B 2307/7246; B32B 2309/105; B32B 2439/70; B32B 2250/02; B32B 2250/03; B32B 2250/24; B32B 2270/00; B32B 2307/412; B32B 2307/558; B32B 2307/7265; B32B 2307/732; B65D 65/40
See application file for complete search history.

(56) References Cited

U.S. PATENT DOCUMENTS 4,647,483 A * 3/1987 Tse .................... B32B 27/08
                                                     138/DIG. 7
5,094,799 A    3/1992 Takashige et al.

FOREIGN PATENT DOCUMENTS

| JP | H06-037081 | B2 |   | 5/1994 |
|----|------------|----|---|--------|
| JP | 2000-006340 | A |   | 1/2000 |
| JP | 2000-198173 | A |   | 7/2000 |
| JP | 2002-103446 | A |   | 4/2002 |
| JP | 2003251772 | A | * | 9/2003 |
| JP | 2004-181776 | A |   | 7/2004 |
| JP | 4178814 | B2 |   | 11/2008 |
| JP | 2010-149380 | A |   | 7/2010 |
| JP | 4660866 | B2 |   | 3/2011 |
| JP | 5068084 | B2 |   | 11/2012 |
| JP | 5383563 | B2 |   | 1/2014 |
| JP | S57-008647 | B2 |   | 2/2018 |

OTHER PUBLICATIONS

Machine translation of JP 2003-251772. (Year: 2003).*
Machine translation of JP 2010-149380. (Year: 2010).*
Japanese Patent Office, International Search Report in International Patent Application No. PCT/JP2018/033221 (dated Dec. 11, 2018).
China National Intellectual Property Administration, First Office Action in Chinese Patent Application No. 201880060986.8 (dated May 19, 2021).
European Patent Office, Extended European Search Report in European Patent Application No. 18861974.6 (dated May 21, 2021).
China National Intellectual Property Administration, Second Office Action in Chinese Patent Application No. 201880060986.8 (dated Feb. 17, 2022).

* cited by examiner

*Primary Examiner* — John D Freeman
(74) *Attorney, Agent, or Firm* — Leydig, Voit & Mayer, Ltd.

(57) ABSTRACT

To provide a laminated stretched polyamide film having excellent an excellent water-resistant adhesive property (water-resistant laminate strength), impact resistance, and pinhole resistance. A laminated stretched polyamide film in which an easily adhesive layer (layer B) is laminated on at least one surface of a base layer (layer A), wherein the layer A contains not less than 70% by mass of polyamide 6, and the layer B contains 0 to 40% by mass of polyamide 6 and 60 to 100% by mass of a polyamide 6 copolymer in which a ratio of a copolymerization component in the copolymer is 3 to 35% by mass.

20 Claims, No Drawings

LAMINATED STRETCHED POLYAMIDE FILM

CROSS-REFERENCE TO RELATED APPLICATIONS

This patent application is the U.S. national phase of International Patent Application No. PCT/JP2018/033221, filed Sep. 7, 2018, which claims the benefit of Japanese Patent Application No. 2017-187973, filed Sep. 28, 2017, and Japanese Patent Application No. 2018-016402, filed Feb. 1, 2018, which are incorporated by reference in their entireties herein.

TECHNICAL FIELD

The present invention relates to a biaxially stretched polyamide film that has an excellent adhesive property. In particular, the present invention relates to a biaxially stretched polyamide film that has excellent water-resistant adhesive strength to a sealant film.

BACKGROUND ART

A biaxially stretched polyamide film has excellent tensile strength, bending strength, pinhole resistance, oil resistance, oxygen gas barrier property, and the like, and therefore, has been used as a packaging material, especially as a material for packaging food.

The biaxially stretched polyamide film is used for a packaging bag, for example. The packaging bag is usually made by laminating a polyolefin film that is capable of being heat-sealed (also referred to as a sealant film) such as polyethylene, polypropylene, or the like on the biaxially stretched polyamide film and by heat-sealing edges that become closed parts of a bag. Such a biaxially stretched polyamide film has been widely used as a food packaging material.

However, a laminated film composed of the biaxially stretched polyamide film and the sealant film has a problem that when the laminated film is used as a liquid soup bag or a bag for a watery material, the films that have been laminated are separated because the adhesive strength between the films that have been laminated (also referred to as laminate strength) is insufficient. In particular, the laminated film has a disadvantage that when the laminated film is hydrothermally treated at high temperatures such as retorting, water penetrates between the films that have been laminated, and the laminate strength between the biaxially stretched polyamide film and the sealant film decreases greatly.

As a method to improve laminate strength, a method in which a film surface is coated in a film manufacturing process to increase adhesive strength has been proposed (see patent literature 1). However, this method has a problem that productivity is reduced, and manufacturing cost increases. In addition, the method has a problem that blocking and defects such as a stripe and a flaw due to the coating occur. Therefore, a biaxially stretched polyamide film having high laminate strength without a coating is desired.

Accordingly, a laminated polyamide film that is made by co-extruding a layer as a surface layer in which a copolymerization polyamide is blended and biaxially stretching the unstretched sheet has been proposed (see patent literature 2). However, while laminate strength is increased by this method, the surface of the film has to be coated in a film manufacturing process to obtain high water-resistant laminate strength.

Meanwhile, a method for manufacturing a biaxially stretched polyamide film having an improved sequential biaxially stretching property composed of a polyamide 6/66 copolymer has been proposed (see patent literature 3).

Also, a method for manufacturing a biaxially stretched polyamide 6/66 copolymer film having good thickness precision by a tubular method has been proposed (see patent literature 4).

These biaxially stretched polyamide films each composed of a polyamide 6/66 copolymer has a lower melting point compared to those of polyamide 6 and polyamide 66. The biaxially stretched polyamide films therefore have low heat resistance and dimensional stability at high temperatures and are not suitable to be used as a film for a packaging bag used for boiling treatment and retorting treatment.

A five-layered biaxially stretched polyamide film made by laminating and extruding a layer composed essentially of polyamide 6, a layer composed of polyamide 6 and polyamide 6/66, and a barrier layer containing a saponified ethylene-vinyl acetate copolymer has been proposed (see patent literature 5). However, the film around clip grippers in a tenter cannot be recovered and reused because the five-layered biaxially stretched polyamide film includes the barrier layer containing the saponified ethylene-vinyl acetate copolymer. Using a layer composed essentially of poly(m-xylylene adipamide) as a barrier layer has also been proposed (see patent literature 6). However, in this case, the film has a problem of having reduced impact resistance and pinhole resistance.

CITATION LIST

Patent Literature

[PTL 1] Japanese Patent No. 04660866
[PTL 2] Japanese Patent No. 04178814
[PTL 3] Japanese Examined Patent Publication No. S57-8647
[PTL 4] Japanese Examined Patent Publication No. H06-37081
[PTL 5] Japanese Patent No. 05068084
[PTL 6] Japanese Patent No. 05383563

SUMMARY OF THE INVENTION

Problems to be Solved by the Invention

An object of the present invention is to solve the above-mentioned problems of conventional biaxially stretched polyamide films and to provide, at a low cost, a biaxially stretched polyamide film that has excellent adhesive strength, especially water-resistant laminate strength.

Solution to the Problems

The inventors conducted earnest studies and found that the issues can be solved with a laminated stretched polyamide film made by laminating an easily adhesive layer composed essentially of a polyamide 6 copolymer on a base layer composed essentially of polyamide 6.

The present invention includes the following configurations.

1. A laminated stretched polyamide film in which an easily adhesive layer (layer B) is laminated on at least one surface of a base layer (layer A), wherein the layer A contains not less than 70% by mass of polyamide 6, and the layer B contains 0 to 40% by mass of polyamide 6 and 60 to 100% by mass of a polyamide 6 copolymer in which a ratio of a copolymerization component in the copolymer is 3 to 35% by mass.

2. The laminated stretched polyamide film according to 1., wherein the layer A and the layer B are laminated in an order of the layer A/the layer B or the layer B/the layer A/the layer B.

3. The laminated stretched polyamide film according to 1. or 2., wherein the polyamide 6 copolymer is a polyamide 6/66 copolymer.

4. The laminated stretched polyamide film according to 3., wherein the layer A contains 0.5 to 30% by mass of the polyamide 6/66 copolymer.

5. The laminated stretched polyamide film according to 1. or 2., wherein the polyamide 6 copolymer is a polyamide 6/polyamide 12 copolymer.

6. The laminated stretched polyamide film according to 5., wherein the layer A contains 0.5 to 30% by mass of the polyamide 6/polyamide 12 copolymer.

7. The laminated stretched polyamide film according to any one of 1. to 6., wherein the laminated stretched polyamide film has a thickness of 5 to 30 μm, the layer A has a thickness of not less than 4.5 μm, and the layer B has a thickness of not less than 0.5 μm.

8. The laminated stretched polyamide film according to any one of 1. to 7., wherein the laminated stretched polyamide film has a water-resistant laminate strength of not less than 2.0 N/15 mm.

The laminated stretched polyamide film of the present invention has excellent tensile strength, impact strength, bending strength, pinhole resistance, oil resistance, and oxygen gas barrier property of a biaxially stretched polyamide film, due to a layer A containing not less than 70% by mass of polyamide 6.

The layer B contributes to the above-mentioned excellent characteristics of the biaxially stretched polyamide film, while laminate strength with a sealant film is highly increased. In particular, the layer B can substantially improve water-resistant laminate strength.

Advantageous Effects of the Invention

The laminated stretched polyamide film of the present invention has high water-resistant laminate strength in addition to excellent impact strength, pinhole resistance, oxygen gas barrier property, and the like of a biaxially stretched polyamide film. Therefore, the laminated stretched polyamide film is effective for preventing a soup packaging bag, a watery material packaging bag, and the like from breaking due to impact and vibration during transportation.

Also, the laminated stretched polyamide film of the present invention has advantages that the laminated stretched polyamide film has good productivity, is economical, and has few defects such as a flaw due to an elimination of a coating process. The laminated stretched polyamide film of the present invention has an advantage that the laminated stretched polyamide film is hygienic because a coating agent is not laminated.

DESCRIPTION OF EMBODIMENTS

In the following, the present invention is described in detail.

A laminated stretched polyamide film of the present invention is a laminated stretched polyamide film in which an easily adhesive layer (layer B) containing 0 to 40% by mass of polyamide 6 and 60 to 100% by mass of a polyamide 6 copolymer in which a ratio of a copolymerization component in the copolymer is 3 to 35% by mass is laminated on at least one surface of a base layer (layer A) containing not less than 70% by mass of polyamide 6.

Examples of the laminate structure of the laminated stretched polyamide film of the present invention include a structure in which the layer A and the layer B are laminated in an order of the layer A/the layer B or the layer B/the layer A/the layer B.

The laminated stretched polyamide film of the present invention has a total thickness of 5 to 30 μm. When the total thickness of the laminated stretched polyamide film is thicker than 30 μm, performance of the laminated stretched polyamide film is saturated in terms of strength. In addition, flexibility is reduced when such a laminated stretched polyamide film laminated with a sealant is used as a packaging bag.

The base layer (layer A) of the laminated stretched polyamide film of the present invention has a thickness of not less than 4.5 μm. When the thickness of the base layer (layer A) is less than 4.5 μm, the entire film becomes too soft to be processed in a printer or a bag making machine. In addition to the structure in which the layer A and the layer B are laminated in the order of the layer A/the layer B or the layer B/the layer A/the layer B above, the laminated structure of the laminated stretched polyamide film of the present invention may have a structure in which the layer A and the layer B are laminated in an order of the layer B/the layer A/the layer B/the layer A/the layer B, and may even have a greater thickness structure in which a still greater number of the layer A and the layer B are laminated. In such a case, the total thickness of the layers A is preferably not less than 4.5 μm.

The easily adhesive layer (layer B) of the laminated stretched polyamide film of the present invention has a thickness of not less than 0.5 μm. When the thickness of the layer B is less than 0.5 μm, water-resistant laminate strength that is the object of the present invention cannot be obtained. There is no specific upper limit for the thickness of the layer B. However, the layer B preferably has a thickness of not more than 5 μm because when the layer B has a thickness of more than 5 μm, water-resistant laminate strength starts to be saturated. Here, the thickness of the easily adhesive layer (layer B) that needs to be not less than 0.5 μm is the thickness of the layer B at the surface on the side on which a sealant is laminated. As for the structure in which the layer A and the layer B are laminated in the order of the layer B/the layer A/the layer B, the structure in which the layer A and layer B are laminated in the order of the layer B/the layer A/the layer B/the layer A/the layer B, and the like, layers other than the layer that has a surface on which a sealant is laminated may have a thickness of less than 0.5 μm.

The base layer (layer A) of the laminated stretched polyamide film of the present invention contains not less than 70% by mass of polyamide 6. When the layer A contains less than 70% by mass of polyamide 6, sufficient impact strength, pinhole resistance, dimensional stability at high temperatures, and transparency are not obtained.

Polyamide 6 to be used in the base layer (layer A) is usually manufactured by ring-opening polymerization of ε-caprolactam. ε-caprolactam monomers in the polyamide 6 obtained by the ring-opening polymerization are usually removed with hot water, and then the polyamide 6 is dried and melt-extruded with an extruder.

The polyamide 6 preferably has a relative viscosity of 1.8 to 4.5, and more preferably 2.6 to 3.2. When the relative viscosity is lower than 1.8, the film has insufficient impact strength. When the relative viscosity is higher than 4.5, load on the extruder becomes large, and it becomes difficult to obtain a sheet before stretching.

The base layer (layer A) may contain 0.5 to 30% by mass of a polyamide 6 copolymer. Adhesive strength between the layer A and the layer B can be increased by including the polyamide 6 copolymer in the layer A. The polyamide 6 copolymer contained in the base layer (layer A) and the polyamide 6 copolymer in the layer B preferably contain the same copolymerization component.

The layer A may contain 0.5 to 30% by mass of polyamide MXD6 (poly(m-xylylene adipamide)). A stretching property can be improved by including the polyamide MXD6. As a result, effects to restrain film breakage during production of the film and to reduce film thickness variation are provided.

The layer A may contain 0.5 to 30% by mass of a polyamide elastomer or a polyolefin elastomer. Pinhole resistance can be improved by including the polyamide elastomer or the polyolefin elastomer.

Examples of the polyamide elastomer to be used include a polyamide elastomer composed of a hard segment of nylon 12 and a soft segment of polytetramethylene glycol, and the like.

Examples of the polyolefin elastomer to be used include a block copolymer having a polyolefin as a hard segment and various types of rubber component as a soft segment, and the like. Examples of the polyolefin constituting a hard segment include ethylene, propylene, 1-butene, 1-pentene, 4-methyl-1-pentene, and the like. Examples of the rubber component constituting a soft segment include ethylene-propylene rubber (EPR), ethylene propylene dien rubber (EPDM), polybutadiene, and the like.

The easily adhesive layer (layer B) of the laminated stretched polyamide film of the present invention contains 60 to 100% by mass of a polyamide 6 copolymer in which a ratio of a copolymerization component in the copolymer is 3 to 35% by mass.

When the content of the polyamide 6 copolymer in the easily adhesive layer (layer B) is lower than 60% by mass, sufficient water-resistant laminate strength is not obtained.

The ratio of the copolymerization component in the polyamide 6 copolymer above is 3 to 35% by mass.

When the ratio of the copolymerization component is lower than 3% by mass, sufficient water-resistant laminate strength is not obtained.

When the ratio of the copolymerization component in the copolymer is higher than 35% by mass, handling may become difficult at the time of supplying the material.

The polyamide 6 copolymer above preferably has a melting point of 170 to 220° C., more preferably 175 to 215° C., and even more preferably 180 to 210° C. When the polyamide 6 copolymer has a melting point of higher than 215° C., a sufficient water-resistant adhesive property may not be obtained. When the polyamide 6 copolymer has a melting point of lower than 170° C., handling may become difficult at the time of supplying the material.

The polyamide 6 copolymer to be used in the easily adhesive layer (layer B) above is obtained by copolymerizing ε-caprolactam or aminocaproic acid with a copolymerization component in a ratio of 3 to 35% by mass. Here, the ratio of the copolymerization is in % by mass after monomers remaining after the copolymerization are removed with hot water and the like.

The polyamide 6 copolymer is obtained by copolymerizing ε-caprolactam with, for example, a lactam other than ε-caprolactam, an amino acid other than aminocaproic acid, or a salt of a dicarboxylic acid and a diamine, as the copolymerization component. Examples of a monomer copolymerized with ε-caprolactam in the polymerization of the polyamide 6 copolymer include undecane lactam, lauryl lactam, amino undecanoic acid, amino lauric acid, adipic acid, pimelic acid, azelaic acid, sebacic acid, terephthalic acid, isophthalic acid, hexamethylenediamine, nonanediamine, decane diamine, methyl pentane diamine, methaxylilene diamine, trimethyl hexamethylene diamine, and the like.

Examples of the polyamide 6 copolymer above include a polyamide 6/66 copolymer, a polyamide 6/polyamide 12 copolymer, a polyamide 6/6T copolymer, a polyamide 6/610 copolymer, a polyamide 6/6I copolymer, a polyamide 6/9T copolymer, a polyamide 6/6I copolymer, a polyamide 6/polyamide 11 copolymer, and the like.

The polyamide 6/66 copolymer to be used in the easily adhesive layer (layer B) is obtained, for example, by a method in which ε-caprolactam is polymerized with hexamethylene diammonium adipate.

A commercially available product such as Ultramid C3301 (manufactured by BASF), Nylon 5023B (manufactured by Ube Industries, Ltd.), and the like can also be used.

The products above can also be used as the polyamide 6/66 copolymer that may be contained in the layer A in an amount of 0.5 to 30% by mass.

The copolymerization proportion of polyamide 6 and polyamide 66 in the polyamide 6/66 copolymer is such that the ratio of the polyamide 66 in the polyamide 6/66 copolymer is 3 to 35% by mass, preferably 5 to 30% by mass, and more preferably 5 to 25% by mass.

When the ratio of the polyamide 66 in the polyamide 6/66 copolymer is lower than 3% by mass, an easily adhesive property, which is the issue of the present invention, is not developed.

When the ratio of the polyamide 66 in the polyamide 6/66 copolymer is higher than 35% by mass, crystallinity of the copolymer decreases, and handling of the copolymer may become difficult.

The polyamide 6/66 copolymer preferably has a relative viscosity of 1.8 to 4.5, and more preferably 2.6 to 3.2.

The polyamide 6/polyamide 12 copolymer used in the easily adhesive layer (layer B) is obtained, for example, by a method in which ε-caprolactam is polymerized with ω-lauryl lactam.

A commercially available product such as nylon resin 7024B (manufactured by Ube Industries, Ltd.), and the like can also be used.

The products above can also be used as a polyamide 6/polyamide 12 copolymer that may be contained in the layer A in an amount of 0.5 to 30% by mass.

The copolymerization proportion of polyamide 6 and polyamide 12 in the polyamide 6/polyamide 12 copolymer is such that the ratio of the polyamide 12 in the polyamide 6/polyamide 12 copolymer is 3 to 35% by mass, preferably 5 to 30% by mass, and more preferably 5 to 25% by mass.

When the ratio of the polyamide 12 in the polyamide 6/polyamide 12 copolymer is lower than 3% by mass, an easily adhesive property, which is the issue of the present invention, is not developed.

When the ratio of the polyamide 12 in the polyamide 6/polyamide 12 copolymer is higher than 35% by mass, crystallinity of the copolymer decreases, and handling of the copolymer may become difficult.

The polyamide 6/polyamide 12 copolymer preferably has a relative viscosity of 1.8 to 4.5, and more preferably 2.5 to 4.0.

The important point in the present invention is that the easily adhesive layer (layer B) containing the polyamide 6 copolymer is laminated on the surface of the base layer (layer A), on the side on which a sealant is laminated, whereby the degree of crystallinity of the surface on which the sealant is laminated is lowered and the adhesive property is improved.

A preferable method to laminate the easily adhesive layer (layer B) containing the polyamide copolymer on the base layer (layer A) is a co-extrusion method using a feed block, a multi-manifold, or the like. Other than the co-extrusion method, a dry lamination method, an extrusion lamination method, or the like can also be selected.

When lamination is performed by the co-extrusion method, a relative viscosity of polyamide to be used in the layer A and the layer B is preferably selected to reduce the difference between melt viscosities of the layer A and the layer B.

A method to obtain the laminated stretched polyamide film of the present invention may be either a sequential biaxially stretching method or simultaneous biaxially stretching method. The sequential biaxially stretching method is preferable because the sequential biaxially stretching method is capable of accelerating a film manufacturing speed, and therefore, has an advantage in terms of cost. The film may be a uniaxially stretched film made by a uniaxial stretching method. The uniaxial stretching method produces a uniaxially stretched polyamide film that has good laminate strength. However, the biaxially stretched polyamide film has better impact resistance and pinhole resistance.

As for a machine, a conventional sequential biaxially stretching machine is used. As for manufacturing conditions, preferable ranges include: an extrusion temperature of 200° C. to 300° C., a stretching temperature in a machine direction (may be abbreviated as MD), which is a flow direction of the machine, of 50 to 100° C., a stretch ratio in the machine direction of 2 to 5, a stretching temperature in a transverse direction (may be abbreviated as TD) of the machine of 120 to 200° C., a stretch ratio in the transverse direction of 3 to 5, and a heat setting temperature of 200° C. to 230° C.

As for stretching conditions of the laminated stretched polyamide film of the present invention, the laminated stretched polyamide film is preferably stretched not less than 2.8 times in each of the machine direction and the transverse direction, and more preferably not less than 3.2 times in the transverse direction. A higher heat setting temperature is preferable because a higher heat setting temperature tends to give higher water-resistant laminate strength. When the heat setting temperature is lower than 200° C., sufficient water-resistant laminate strength and thermal dimensional stability may not be obtained.

When the improvement of adhesive strength with a sealant is desired, a coating layer may be provided between a layer containing a polyamide copolymer and a sealant layer. In this case, the coating agent is preferably water-resistant to improve water-resistant laminate strength. When the improvement of adhesive strength with a sealant is desired, a corona treatment, a flame treatment, or the like may be performed.

The easily adhesive layer (layer B) and/or the base layer (layer A) of the laminated stretched polyamide film of the present invention may contain various additives such as a lubricant, an antiblocking agent, a thermal stabilizer, an antioxidant, an antistatic agent, a light resisting agent, and an impact modifier within a range where characteristics such as water-resistant laminate strength are not impaired.

In particular, an organic lubricant such as ethylene bis stearamide (EBS) that exhibits an effect to lower surface energy is preferably added to improve the slipperiness of the film. An inorganic particulate such as a silica particulate is preferably added as an antiblocking agent.

The laminated stretched polyamide film of the present invention preferably has a haze value of not larger than 5.0%, more preferably 4.0%, and even more preferably not larger than 2.5%. When the haze value is larger than 5.0%, transparency deteriorates, which makes the laminated stretched polyamide film not suitable for a packaging material of a design with high designability that makes use of transparency.

EXAMPLES

Hereinafter, the present invention is further described more specifically by use of examples. However, the present invention is not limited to the examples.

The evaluation of a film was conducted based on the following measurement methods. Unless otherwise specified, measurements were conducted in a measurement room having an environment of 23° C. and a relative humidity of 65%.

(1) Film Thickness

A film was cut into 10 equal parts in the transverse direction (TD) (as for a narrow film, the film was cut into equal parts having a width that can ensure to allow a measurement of a thickness). The 10 films were stacked on top of the other, cut into a 100 mm film in the machine direction, and conditioned in an environment at a temperature of 23° C. and a relative humidity of 65% for not less than 2 hours.

A thickness at the center of each sample was measured with a thickness measurement apparatus manufactured by Tester Sangyo Co., Ltd., and the average value of the measurements was used as a thickness.

The thicknesses of a base layer (layer A) and an easily adhesive layer (layer B) were obtained by measuring a discharge quantity of the base layer (layer A) and a discharge quantity of the easily adhesive layer (layer B) and performing calculation based on a total thickness of the laminated stretched polyamide film measured by the method above and a ratio of the discharge quantity.

(2) Film Thermal Shrinkage

A film was cut into 5 pieces in the machine direction (MD) and the transverse direction (TD) such that each piece had a width of 20 mm×a length of 250 mm and the obtained 5 pieces were used as test strips. On each test strip, bench marks were drawn 200 mm±2 mm apart from each other with respect to the center part of the test strip. The distance between the bench marks on the test strip before heating was measured at an accuracy of 0.1 mm. The test strip was hung in a hot air drier (manufactured by ESPEC Corp., PHH-202) in a no-load state, and a thermal treatment was performed under a heating condition of 160° C. for 10 minutes. The test strip was removed from a thermostatic chamber and cooled to room temperature. Then, the length and the width were measured at the same part as the part where the initial measurement was performed. A size change rate of each test strip was measured in the machine direction and the transverse direction as a percentage of the size change relative to the initial value. As the size change rate in each direction, the average of the measurements in the direction was used.

(3) Film Haze Value

Each sample was measured with a haze meter (manufactured by Nippon Denshoku Industries Co., Ltd., NDH5000) at different 3 points, and the average value of the measurements was used as the haze value.

(4) Film Impact Strength

Film impact strength was measured using a film impact tester manufactured by Toyo Seiki Seisaku-sho, Ltd. in an environment of a temperature of 23° C. and a relative humidity of 65%. The measurement was performed 10 times, and the film impact strength was evaluated by using the average value of the measurements. An impact sphere having a diameter of ½ inches was used. The film impact strength was expressed in the unit of J.

(5) Film Pinhole Resistance

The number of pinholes was measured using a gelvo flex tester with a thermostatic chamber BE1006 manufactured by Tester Sangyo Co., Ltd. by a method below.

A polyester-based adhesive agent [a mixture of TM-569 (product name) and CAT-10L (product name) manufactured by Toyo-Morton, Ltd. in a mass ratio of 7.2/1 (solid content concentration 23%)] was applied to a film so that a resin solid content after drying was 3.2 g/m². Thereafter, 40 μm of linear low density polyethylene film (L-LDPE film: manufactured by Toyobo Co., Ltd., LIX (registered trademark) L4102) was dry-laminated and then aged in an environment of 40° C. for 2 days to obtain a laminated film.

The resultant dry-laminated film was cut into a 28.0 cm (11 inches)×24.0 cm (9.4 inches) piece. The cut film was left and conditioned under a condition of a temperature of 23° C. and a relative humidity of 50% for not less than 6 hours. After conditioning, the rectangular test film was wound into a cylindrical shape having a diameter of 8.9 cm (3.5 inches). One end of the cylindrical-shaped film was fixed to a circumference of a disk-shaped fixing head in the gelvo flex tester. The other end of the cylindrical-shaped film was fixed to a circumference of a disk-shaped movable head in the tester that is opposed to the fixing head with a 19.4 cm (7.6 inches) gap therebetween. Next, a bending test was performed repeatedly and continuously for 1000 cycles at a speed of 40 cycles per minute. One cycle of the bending test consists of the following: while the movable head was moved 7.6 cm (3.5 inches) in a direction towards the fixing head along an axis between both heads opposed to each other in parallel, the movable head was rotated 440°. Then, the movable head was moved linearly by 6.4 cm (2.5 inches) without a rotation, and these actions were reversed to move the movable head back to the initial position. This was performed at 1° C. Thereafter, the number of pinholes generated in a 19.4 cm (7.6 inches)×25.5 cm (11 inches) part in the tested film excluding the parts which were fixed to the circumference of the fixing head and the movable head was counted (i.e., the number of pinholes per 495 cm² (77 square inches) was counted).

(6) Water-Resistant Laminate Strength (Laminate Strength Under a Condition of Water Adhesion)

A laminated film made by a method similar to that set forth in the description of the pinhole resistance evaluation was cut into a strip shape having a width of 15 mm and a length of 200 mm. One end of the laminated film was peeled at an interface of the biaxially stretched polyamide film and the linear low density polyethylene film. Laminate strength was measured using an autograph (manufactured by Shimadzu Corporation) under a condition of a temperature of 23° C., a relative humidity of 50%, a tensile speed of 200 mm/minute, and a peeling angle of 90° while water was being dropped with a dropper to the peeling interface of the strip-shaped laminated film above. The laminate strength was measured 3 times and evaluated by the average value of the measurements.

(7) Relative Viscosity of Raw Material Polyamide

A polyamide solution was made by dissolving 0.25 g of polyamide in 96% sulfuric acid in a 25 ml measuring flask so as to obtain a concentration of 1.0 g/dl. Relative viscosity was measured at 20° C. using the polyamide solution.

(8) Melting Point of Raw Material Polyamide

A melting point of a raw material polyamide was measured according to JIS K7121 using a SSC5200 type differential scanning calorimeter manufactured by Seiko Instruments Inc. in a nitrogen atmosphere with a sample weight of 10 mg, a heating starting temperature of 30° C., and a temperature rising rate of 20° C./minute, to obtain an endothermic peak temperature (Tmp) as a melting point.

Example 1-1

An equipment consisting of two extruders having a bore diameter of 60 mm and a bore diameter of 25 mm, respectively, and a co-extruding T-die having a width of 380 mm was used. Polyamide 6 (relative viscosity 2.8, melting point 220° C.) was melt-extruded as a base layer (layer A) from the extruder having a bore diameter of 60 mm. A mixture in which polyamide 6 (relative viscosity 2.8, melting point 220° C.) and the polyamide 6/66 copolymer (the ratio of the polyamide 66 being 7% by mass, relative viscosity 2.8, melting point 198° C.) were blended in a mass ratio of 9/91 was melt-extruded as an easily adhesive layer (layer B) from the extruder having a bore diameter of 25 mm. The base layer and the easily adhesive layer were laminated in a feed block into a sheet-shaped structure of the easily adhesive layer (layer B)/the base layer (layer A)/the easily adhesive layer (layer B), and the resultant laminated sheet was extruded from the T-die into a sheet. The laminated sheet was tightly contacted with a cooling roll of which the temperature was regulated to 20° C., to obtain a 200 μm laminated unstretched sheet.

The material used was dried before use so that the material had a moisture content of 0.1% by mass. A higher fatty acid amide and a silica particulate were added in the easily adhesive layer (layer B) so that the easily adhesive layer contained 0.1% by mass of the higher fatty acid amide and 0.5% by mass of the silica particulate.

The resultant laminated unstretched sheet was guided to a roll type stretcher. The laminated unstretched sheet was stretched 1.7 times at 80° C. and then further stretched 1.85 times at 70° C. in the machine direction utilizing a difference in the circumferential speed of rollers. Subsequently, this uniaxially stretched film was guided continuously to a tenter-type stretcher and preheated at 110° C. Then, the uniaxially stretched film was stretched 1.2 times at 120° C., 1.7 times at 130° C., and 2.0 times at 160° C. in the transverse direction (MD), and then subjected to a heat setting treatment at 210° C., and a 3% relaxation treatment at 210° C. and a 2% relaxation treatment at 185° C. Then, the surface of the easily adhesive layer (layer B) was subjected to a corona discharge treatment. Accordingly, a three-layered laminated biaxially stretched polyamide film in which two types of layers, i.e., the layer A and the layer B, were laminated in the order of the layer B/the layer A/the layer B, was produced.

The structure of the feed block and discharge quantity of the extruders were adjusted so that the laminated stretched polyamide film had a total thickness of 15 μm, the base layer (layer A) had a thickness of 12 μm, and the easily adhesive layers (layers B) on outer sides each had a thickness of 1.5 μm.

Example 1-2

A laminated biaxially stretched polyamide film was made by a method similar to that in Example 1-1 except that the base layer (layer A) was made by blending and melt-extruding polyamide 6 and the polyamide 6/66 copolymer in a mass ratio of 95/5, and an easily adhesive layer (layer B) was made by melt-extruding polyamide 6 and the polyamide 6/66 copolymer so that the easily adhesive layer contains the polyamide 6 and the polyamide 6/66 copolymer in a mass ratio of 15/85.

Example 1-3

A laminated biaxially stretched polyamide film was made by a method similar to that in Example 1-2 except that the easily adhesive layer (layer B) was made by melt-extruding polyamide 6 and the polyamide 6/66 copolymer in a mass ratio of 30/70.

Example 1-4

A laminated biaxially stretched polyamide film was made by a method similar to that in Example 1-2 except that the easily adhesive layer (layer B) was made by melt-extruding polyamide 6 and the polyamide 6/66 copolymer in a mass ratio of 40/60.

Example 1-5

A laminated biaxially stretched polyamide film was made by a method similar to that in Example 1-2 except that a polyamide 6/66 copolymer that had a larger copolymerization ratio of polyamide 66 (the ratio of polyamide 66 being 25% by mass, relative viscosity 2.7, melting point 187° C.) was blended in a mass ratio of 15/85 instead of the polyamide 6/66 copolymer (the ratio of the polyamide 66 being 7% by mass, relative viscosity 2.8, melting point 198° C.).

Comparative Example 1-1

A laminated biaxially stretched polyamide film was made by a method similar to that in Example 1-2 except that the easily adhesive layer (layer B) was made by melt-extruding polyamide 6 and the polyamide 6/66 copolymer in a mass ratio of 65/35.

Comparative Example 1-2

A laminated biaxially stretched polyamide film was made by a method similar to that in Example 1-2 except that the easily adhesive layer (layer B) was made by melt-extruding polyamide 6 and the polyamide 6/66 copolymer in a mass ratio of 50/50.

Water-resistant laminate strength and other physical properties of biaxially stretched polyamide films that were made in Example 1-1 to Example 1-5 and Comparative Example 1-1 and Comparative Example 1-2 are shown in table 1. The polyamide 6 is abbreviated as NY6, and the polyamide 6/66 copolymers are abbreviated as NY6/66 in the table.

TABLE 1

|  |  |  | Example | | | | | Comparative Example | |
| --- | --- | --- | --- | --- | --- | --- | --- | --- | --- |
|  |  |  | 1-1 | 1-2 | 1-3 | 1-4 | 1-5 | 1-1 | 1-2 |
| Layer B: Easily | NY6/66 | mass % | 91 | 85 | 70 | 60 | 85 | 35 | 50 |
| adhesive layer | NY6 | mass % | 9 | 15 | 30 | 40 | 15 | 65 | 50 |
| Layer A: Base | NY6 | mass % | 100 | 95 | 95 | 95 | 95 | 95 | 95 |
| layer | NY6/66 | mass % | 0 | 5 | 5 | 5 | 5 | 5 | 5 |
| Water-resistant laminate strength | | N/15 mm | 4.2 | 3.8 | 2.7 | 2.5 | 3.5 | 0.8 | 1.3 |
| Pinhole resistance | | number | 4 | 3 | 2 | 2 | 4 | 2 | 3 |
| Impact strength | | J | 0.8 | 0.8 | 0.8 | 0.8 | 0.9 | 1.0 | 0.9 |
| Thermal shrinkage (MD) | | % | 0.6 | 0.9 | 0.9 | 0.8 | 1.1 | 1.0 | 0.9 |
| Thermal shrinkage (TD) | | % | 1.2 | 1.1 | 1.2 | 1.0 | 1.2 | 0.8 | 1.0 |
| Haze | | % | 1.2 | 0.7 | 0.5 | 0.6 | 0.7 | 0.6 | 0.7 |

As it is clear from the results in table 1, sufficient water-resistant laminate strength is obtained in Example 1-1 to Example 1-5 in which the easily adhesive layer (layer B) contains not less than 60% by mass of the 6/66 copolymer.

On the other hand, sufficient water-resistant laminate strength is not obtained in Comparative Example 1-1 and Comparative Example 1-2 because the easily adhesive layer contains an insufficient amount of the polyamide 6/66 copolymer.

Example 2-1

A laminated biaxially stretched polyamide film was made by a method similar to that in Example 1-1 except that a polyamide 6/polyamide 12 copolymer (7024B manufactured by Ube Industries, Ltd., relative viscosity 2.6, melting point 201° C.) was blended in a mass ratio of 9/91 instead of the polyamide 6/66 copolymer (the ratio of the polyamide 66 being 7% by mass, relative viscosity 2.8, melting point 198° C.).

Example 2-2

A laminated biaxially stretched polyamide film was made by a method similar to that in Example 2-1 except that the base layer (layer A) was made by blending and melt-extruding polyamide 6 and the polyamide 6/polyamide 12 copolymer in a mass ratio of 95/5, and an easily adhesive layer (layer B) was made by melt-extruding polyamide 6 and the polyamide 6/polyamide 12 copolymer so that the easily adhesive layer contains the polyamide 6 and the polyamide 6/polyamide 12 copolymer in a mass ratio of 15/85.

Example 2-3

A laminated biaxially stretched polyamide film was made by a method similar to that in Example 2-2 except that the easily adhesive layer (layer B) was made by melt-extruding polyamide 6 and the polyamide 6/polyamide 12 copolymer in a mass ratio of 30/70.

Example 2-4

A laminated biaxially stretched polyamide film was made by a method similar to that in Example 2-2 except that the easily adhesive layer (layer B) was made by melt-extruding polyamide 6 and the polyamide 6/polyamide 12 copolymer in a mass ratio of 40/60.

Comparative Example 2-1

A laminated biaxially stretched polyamide film was made by a method similar to that in Example 2-2 except that the easily adhesive layer (layer B) was made by melt-extruding polyamide 6 and the polyamide 6/polyamide 12 copolymer in a mass ratio of 65/35.

Comparative Example 2-2

A laminated biaxially stretched polyamide film was made by a method similar to that in Example 2 except that the easily adhesive layer (layer B) was made by melt-extruding polyamide 6 and the polyamide 6/polyamide 12 copolymer in a mass ratio of 50/50.

Water-resistant laminate strength and other physical properties of biaxially stretched polyamide films that were made in Example 2-1 to Example 2-4 and Comparative Example 2-1 and Comparative Example 2-2 are shown in table 2. The polyamide 6 is abbreviated as NY6, and the polyamide 6/polyamide 12 copolymer is abbreviated as NY612 in the table.

TABLE 2

| | | | Example | | | | Comparative Example | |
|---|---|---|---|---|---|---|---|---|
| | | | 2-1 | 2-2 | 2-3 | 2-4 | 2-1 | 2-2 |
| Layer B: Easily adhesive layer | NY612 | mass % | 91 | 85 | 70 | 60 | 35 | 50 |
| | NY6 | mass % | 9 | 15 | 30 | 40 | 65 | 50 |
| Layer A: Base layer | NY6 | mass % | 100 | 95 | 95 | 95 | 95 | 95 |
| | NY612 | mass % | 0 | 5 | 5 | 5 | 5 | 5 |
| Water-resistant laminate strength | | N/15 mm | 4.2 | 3.8 | 3.2 | 2.5 | 0.8 | 1.3 |
| Impact strength | | J | 0.81 | 0.82 | 0.80 | 0.81 | 1.00 | 0.92 |
| Thermal shrinkage (MD) | | % | 0.6 | 0.9 | 0.9 | 0.8 | 1.0 | 0.9 |
| Thermal shrinkage (TD) | | % | 1.2 | 1.1 | 1.2 | 1.0 | 0.8 | 1.0 |
| Haze | | % | 2.5 | 2.8 | 2.2 | 2.0 | 1.4 | 1.9 |

As it is clear from the results in table 2, sufficient water-resistant laminate strength is obtained in Example 2-1 to Example 2-4 in which the easily adhesive layer (layer B) contains not less than 60% of the polyamide 6/polyamide 12 copolymer.

On the other hand, sufficient water-resistant laminate strength is not obtained in Comparative Example 2-1 and Comparative Example 2-2 because the easily adhesive layer (layer B) contains an insufficient amount of the polyamide 6/polyamide 12 copolymer.

While the laminated stretched polyamide film of the present invention has been described above based on several examples, the present invention is not limited to the configurations set forth in the examples above, and modifications can be appropriately made in the configurations by, for example, appropriately combining the configurations set forth in the examples within the scope of the invention without departing from the spirit thereof.

INDUSTRIAL APPLICABILITY

The laminated stretched polyamide film of the present invention has excellent heat resistance, impact resistance, and pinhole resistance. The laminated stretched polyamide film also has an excellent water-resistant adhesive property (water-resistant laminate strength). Therefore, the laminated stretched polyamide film can be suitably used for the application as a packaging material for, for example, packaging a liquid.

The laminated stretched polyamide film of the present invention is applicable as a pickle bag, a large-size bag for a watery material for commercial use, and the like.

The invention claimed is:

1. A laminated stretched polyamide film consisting of one or more easily adhesive layers (layer B) and one or more base layers (layer A) in which each easily adhesive layer (layer B) is directly laminated on at least one surface of a base layer (layer A), wherein
   the layer A contains not less than 70% by mass of polyamide 6, and
   the layer B contains 0 to 40% by mass of polyamide 6 and 60 to 100% by mass of a polyamide 6 copolymer in which a ratio of a copolymerization component in the copolymer is 3 to 35% by mass.

2. The laminated stretched polyamide film according to claim 1, wherein the layer A and the layer B are laminated in an order of the layer A/the layer B or the layer B/the layer A/the layer B.

3. The laminated stretched polyamide film according to claim 1, wherein the polyamide 6 copolymer is a polyamide 6/66 copolymer.

4. The laminated stretched polyamide film according to claim 3, wherein the layer A contains 0.5 to 30% by mass of the polyamide 6/66 copolymer.

5. The laminated stretched polyamide film according to claim 1, wherein the polyamide 6 copolymer is a polyamide 6/polyamide 12 copolymer.

6. The laminated stretched polyamide film according to claim 5, wherein the layer A contains 0.5 to 30% by mass of the polyamide 6/polyamide 12 copolymer.

7. The laminated stretched polyamide film according to claim 1, wherein
   the laminated stretched polyamide film has a thickness of 5 to 30 μm,
   the layer A has a thickness of not less than 4.5 μm, and
   the layer B has a thickness of not less than 0.5 μm.

8. The laminated stretched polyamide film according to claim 1, wherein the laminated stretched polyamide film has a water-resistant laminate strength of not less than 2.5 N/15 mm.

9. The laminated stretched polyamide film according to claim 4, wherein
the laminated stretched polyamide film has a thickness of 5 to 30 μm,
the layer A has a thickness of not less than 4.5 μm, and
the layer B has a thickness of not less than 0.5 μm.

10. The laminated stretched polyamide film according to claim 4, wherein the laminated stretched polyamide film has a water-resistant laminate strength of not less than 2.5 N/15 mm.

11. The laminated stretched polyamide film according to claim 6, wherein
the laminated stretched polyamide film has a thickness of 5 to 30 μm,
the layer A has a thickness of not less than 4.5 μm, and
the layer B has a thickness of not less than 0.5 μm.

12. The laminated stretched polyamide film according to claim 6, wherein the laminated stretched polyamide film has a water-resistant laminate strength of not less than 2.5 N/15 mm.

13. The laminated stretched polyamide film according to claim 2, wherein the polyamide 6 copolymer is a polyamide 6/66 copolymer.

14. The laminated stretched polyamide film according to claim 13, wherein the layer A contains 0.5 to 30% by mass of the polyamide 6/66 copolymer.

15. The laminated stretched polyamide film according to claim 14, wherein
the laminated stretched polyamide film has a thickness of 5 to 30 μm,
the layer A has a thickness of not less than 4.5 μm, and
the layer B has a thickness of not less than 0.5 μm.

16. The laminated stretched polyamide film according to claim 14, wherein the laminated stretched polyamide film has a water-resistant laminate strength of not less than 2.5 N/15 mm.

17. The laminated stretched polyamide film according to claim 2, wherein the polyamide 6 copolymer is a polyamide 6/polyamide 12 copolymer.

18. The laminated stretched polyamide film according to claim 17, wherein the layer A contains 0.5 to 30% by mass of the polyamide 6/polyamide 12 copolymer.

19. The laminated stretched polyamide film according to claim 18, wherein
the laminated stretched polyamide film has a thickness of 5 to 30 μm,
the layer A has a thickness of not less than 4.5 μm, and
the layer B has a thickness of not less than 0.5 μm.

20. The laminated stretched polyamide film according to claim 18, wherein the laminated stretched polyamide film has a water-resistant laminate strength of not less than 2.5 N/15 mm.

* * * * *